United States Patent Office 2,993,069
Patented July 18, 1961

2,993,069
PRODUCTION OF BENZOYLPIMELATES

Louis R. Freimiller, Philadelphia, and Charles H. McKeever, Meadowbrook, Pa., assignors to Rohm & Haas Company, Philadelphia, Pa., a corporation of Delaware
No Drawing. Filed Apr. 30, 1956, Ser. No. 581,347
8 Claims. (Cl. 200—475)

This invention concerns specific benzoylpimelates as new compositions of matter. It further deals with a method for the preparation of these benzoylpimelates.

The compounds of this invention may be represented by the formula

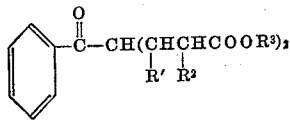

in which R′ is a hydrogen atom or an alkyl group of one to eight carbon atoms, R² is a hydrogen atom, a methyl or ethyl group, and R³ is an alkyl group of one to eighteen carbon atoms, an aryl, alkaryl, or aralkyl group of six to sixteen carbon atoms, and an alkoxyalkyl group of two to twelve carbon atoms.

As a representation of R′, a hydrogen atom is preferred but there may be used, quite satisfactorily, alkyl groups of one to eight carbon atoms. Typical of these are methyl, ethyl, propyl, butyl, hexyl, and octyl groups. The R′ alkyl group may be used in any of the known isomeric forms, such as normal, isotertiary, and the like. For instance, the octyl group may be n-octyl, isoöctyl, tert-octyl, 2-methylheptyl, 2,4-dimethylhexyl, 3-ethylhexyl, 3-propylpentyl, 2,2,4-trimethylpentyl, 2,2,4,4-tetramethylbutyl, and the like. The R′ alkyl groups may be of the straight chain or cyclic type.

Typical of the group that R³ represents includes methyl, ethyl, propyl, butyl, hexyl, octyl, decyl, dodecyl, tetradecyl, octadecyl, phenyl, benzyl, phenylethyl, phenylbutyl, phenyloctyl, phenyldecyl, butylphenyl, octylphenyl, nonylphenyl, decylphenyl, ethylbenzyl, hexylbenzyl, octylbenzyl, nonylbenzyl, dimethylphenyl, diethylphenyl, methylbutylphenyl, naphthyl, naphthylethyl, naphthylpropyl, naphthylbutyl, naphthylhexyl, ethylnaphthylbutyl, methoxymethyl, methoxyethyl, methoxypropyl, methoxybutyl, methoxyhexyl, methoxyoctyl, methoxynonyl, methoxydecyl, ethoxymethyl, ethoxyethyl, ethoxybutyl, ethoxyhexyl, ethoxyoctyl, ethoxydecyl, propoxymethyl, propoxypropyl, propoxypentyl, propoxyheptyl, propoxyoctyl, butoxyethyl, butoxybutyl, butoxypentyl, butoxyoctyl, pentoxymethyl, pentoxypropyl, pentoxypentyl, pentoxyheptyl, hexoxyethyl, hexoxybutyl, hexoxyhexyl, heptoxymethyl, heptoxyethyl, heptoxypropyl, heptoxybutyl, heptoxypentyl, octoxymethyl, octoxyethyl, octoxybutyl, monoxymethyl, monoxyethyl, monoxypropyl, and decoxyethyl.

The alkyl groups of R³, like those of R′, may be employed in any of the known spatial arrangements, such as normal, iso-, tertiary, and the like, and they may be straight-chain or cyclic. Also, alkyl substituents on aromatic rings may be located at any of the possible positions.

The products of this invention are prepared by bringing together at a reacting temperature acetophenone and a compound having the formula R′CH=CR²COOR³.

Illustrative of the compounds that may be reacted with acetophenone include the following:

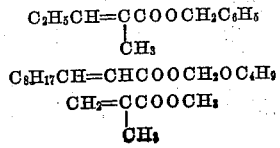

$CH_2=CHCOOC_8H_{17}$
$CH_3CH=CHCOOC_2H_4C_{10}H_8$
$CH_2=CCOOC_4H_8OC_2H_5$
$\phantom{CH_2=C}|$
$\phantom{CH_2=CCO}CH_3$
$CH_2=CCOOC_6H_5$
$\phantom{CH_2=C}|$
$\phantom{CH_2=CCO}CH_3$
$CH_3CH=CHCOOC_{10}H_{20}OC_2H_5$
$C_4H_9CH=CCOOC_6H_4C_8H_{17}$
$\phantom{C_4H_9CH=C}|$
$\phantom{C_4H_9CH=CCO}CH_3$
$CH_2=CHCOOC_2H_5$
$CH_2=C-COOC_2H_5$
$\phantom{CH_2=C-}|$
$\phantom{CH_2=C-CO}C_2H_5$ Temperatures in the range of about 40° C. to the reflux temperature, which is usually not above about 220° C., are advantageously employed with a range of about 40° to 85° C. preferred.

The present reaction is generally strongly exothermic in nature and frequently must be controlled by cooling, such as with an ice bath. In most instances, enough heat is autogenously supplied by the exothermic heat of reaction to maintain the reaction temperature in the stated range. In most cases, external heat is needed to reach the upper parts of the temperature range. Generally, when the heat of reaction has subsided the reaction is substantially completed, but heat is usually supplied to the reaction system for about ½ to 2 hours or more in order to maximize yields. Yields of 65% to 75% and above are consistently obtained.

Essentially anhydrous conditions are employed and it is preferred to have no water present at all. No solvent is required or used. In fact, the use of a solvent usually interferes with and impedes the progress of the instant reaction. In the present instance a concentrated reactive system is required.

A very strong alkaline catalyst is required to effect the present reaction. Suitable in this respect are alkali metal alkoxides, such as sodium methoxide, sodium ethoxide, potassium butoxide, and lithium methoxide; alkali metal amides, such as sodium amide, potassium amide, and lithium amide; alkali metal hydrides, such as sodium hydride, potassium hydride, and lithium hydride; and alkali metals, such as sodium, potassium, and lithium. The oxides and hydroxides of the alkali metals, while under most circumstances are considered strong alkali agents, are not strong enough to function satisfactorily in the present reaction and, hence, are not within the contemplation of the present definition. Because of the strong exothermic nature of the instant reaction, it is preferable to add the catalyst to the reaction mixture in small portions.

The reactants of this invention combine in a molecular ratio of one of acetophenone to two of $$R'CH=CR^2COOR^3$$

The present union occurs at the methyl group of acetophenone and, while such methyl group has three hydrogen atoms, two and only two hydrogen atoms appear to be available for the instant reaction under the described conditions. Surprisingly, there is little or no 1:1 or 1:3 adduct. There is principally produced only the 1:2 adduct. The present reactants are known or may be readily prepared by known methods.

At the completion of the present reaction, the catalyst is neutralized with acid such as acetic, hydrochloric, sulfuric, and the like. The reaction mixture is then distilled, preferably under reduced pressure. The water, from the acid neutralization, and the unused reactants distil off, leaving the product, which may also be distilled, if desired. The products are generally colorless to yellow liquids.

The compounds of this invention are valuable plasticizers, particularly for polyvinyl chloride. For instance, a mixture of 60 parts of polyvinyl chloride, 40 parts of dimethyl 2,6-dimethyl-4-benzoylpimelate, 1 part of tribasic lead sulfate, and 0.5 part of stearic acid was milled for seven minutes at 325° F. There resulted a light, flexible film of good durability. Comparable results are obtained with the other products of this invention with increased advantages observed with the higher molecular weight compounds.

The instant compounds are valuable pesticides, particularly in the control of aphids and mites. In percentages as low as 0.1% by weight, the present compounds exhibit striking potency against aphids and mites. The compounds of this invention may be used alone or incorporated with other pesticides, as desired, by known methods. They may be used in aqueous emulsions, aerosols, dusts, or oil sprays. For instance, an effective and useful pesticidal formulation may be prepared by employing, by weight, 25 parts of a compound of this invention, 71 parts of xylene, toluene, or a commercially available blend of aromatic hydrocarbons, and 4 parts of an emulsifier to yield an emulsion concentrate and then adding this concentrate to water. Suitable as an emulsifier is a blend consisting of from 60% to 90% of a non-ionic surface active agent such as octylphenoxypolyethoxyethanol, in which there are 10 to 80 units of ethylene oxide, and from 40% to 10% of an anionic surface active agent, such as calcium dodecylbenzenesulfonate. There is added four pounds of the emulsion concentrate to one hundred gallons of water.

As a valuable concomitant property along with pesticidal activity, the present compounds are non-phytotoxic.

The compounds of this invention as well as their method of preparation may be more fully understood from the following examples which are offered by way of illustration and not by way of limitation. Parts by weight are used throughout.

*Example 1*

There are added to an oven-dried flask, equipped with a thermometer and a stirrer, 60 parts of acetophenone and 95 parts of methyl acrylate. The mixture is warmed to 30° C. and 0.5 part of sodium methoxide is added. The heat of reaction raises the temperature to 40° to 45° C. where it is held by intermittent cooling. When the heat of reaction subsides two 0.25 part-portions of sodium methoxide are added and then three 0.50 part-portions of sodium methoxide are added, after which no heat of reaction is observed. The reaction mixture is heated to 43 to 48° C. for forty-five minutes and then cooled. The catalyst is neutralized with 2.8 parts of glacial acetic acid and the neutralized mixture is distilled. The product distils at 159° to 161° C. at 0.2 mm. absolute pressure, has an $n_d^{20}$ value of 1.5145, and a saponification number of 383 (383.8 theoretical). It contains 66.05% carbon (65.73%) theoretical) and 6.91% hydrogen (6.91% theoretical). The product is named dimethyl 4-benzoylpimelate and may be represented by the formula

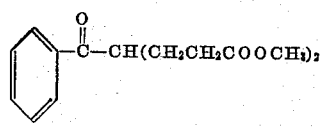

In a similar way, there are made by reacting acetophenone with benzyl 2-methyl-2-pentenoate and butoxymethyl 2-undecenoate, respectively, the compounds

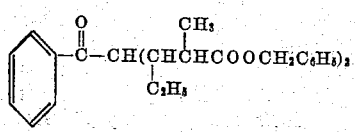

and

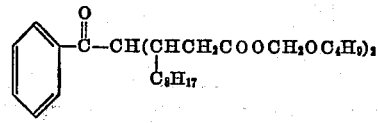

*Example 2*

There are added to a reaction vessel 120 parts of acetophenone and 324 parts of phenyl methacrylate. There is added to the reaction mixture, in 1.2 part-portions, a total of 7.2 parts of sodium hydride. Additions of sodium hydride are made as the heat of reaction abates. The reaction is held at 56° to 65° C. during the time in which a heat of reaction is noticed. After the last addition of sodium hydride, no heat of reaction is noticed. The reaction mixture is heated to 82° to 85° C. for one hour and then cooled. The mixture is neutralized with hydrochloric acid. Water and unused reactants are stripped off at reduced pressure and the product is isolated by distillation under reduced pressure. The product corresponds to diphenyl 2,6-dimethyl-4-benzoylpimelate.

In an analogous way, using metallic lithium as a catalyst, there are prepared by reacting acetophenone with ethoxybutyl methacrylate and naphthylethyl crotonate, respectively, the products diethoxybutyl 2,6-dimethyl-4-benzoylpimelate and dinaphthylethyl 2,3,5,6-tetramethyl-4-benzoylpimelate.

*Example 3*

There are added to an oven-dried reaction vessel 240 parts of acetophenone and 440 parts of methyl methacrylate. There is then introduced 6 parts of potassium ethoxide. The resulting heat of reaction causes the temperature to rise to 43° to 46° C. even though intermittent ice bath cooling is employed. There then follows three more additions of two parts each of potassium ethoxide. After the last addition of potassium ethoxide, there is no heat of reaction generated. The reaction mixture is maintained at 43° to 45° C. for one hour and then cooled. The catalyst is neutralized with 13.8 parts of acetic acid. The reaction mixture is stripped under reduced pressure and the product isolated by distillation at 146° to 149° C. at 0.1 to 0.2 mm. absolute pressure. The product has an $n_d^{20}$ value of 1.5025, a saponification number of 353 (350.2 theoretical) and contains 67.54% carbon (67.47% theoretical) and 7.54% hydrogen (7.56% theoretical). It may be named dimethyl 2,6-dimethyl-4-benzoylpimelate.

In a similar way, there are made, using potassium amide as catalyst, the compounds

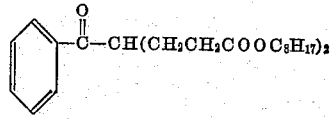

and

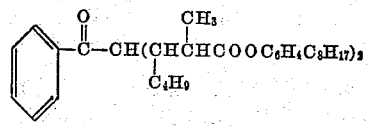

by reacting acetophenone with octyl acrylate and octylphenyl 2-methyl-2-heptenoate, respectively.

*Example 4*

There are introduced into a reaction vessel 100 parts of ethyl acrylate and 60 parts of acetophenone. There is added to the reaction mixture two parts of metallic sodium. Subsequent two-part additions of metallic sodium are made until a total of 10 parts are introduced. After the last addition of sodium, no heat of reaction is noticed. The reaction is conducted in the range of 80° to 101° C. (reflux) for two hours after the last sodium addition. The reaction mixture is cooled and the catalyst is neutralized with sulfuric acid. The unused reactants and water are stripped off under reduced pressure and the product is isolated by distillation under reduced pressure. The product corresponds to diethyl 4-benzoylpimelate.

Correspondingly, there are prepared by reacting acetophenone with ethoxydecyl crotonate, octadecyl methacrylate, and ethyl ethacrylate respectively, the products of this invention having the formulas

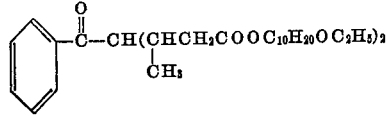

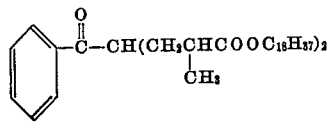

and

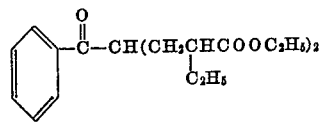

We claim:
1. A method for the preparation of the compound having the formula

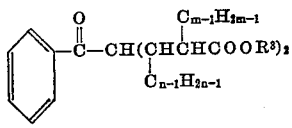

in which $n$ is an integer of one to nine, $m$ is an integer of one to three, and $R^3$ is a member from the class consisting of alkyl groups of one to eighteen carbon atoms, alkoxyalkyl groups of two to twelve carbon atoms, and aryl, alkaryl, and aralkyl groups of six to sixteen carbon atoms, which comprises bringing together at a reacting temperature in the range of about 40° C. to the reflux temperature of the reaction mixture and thereby causing to react substantially one molecular equivalent of acetophenone and substantially two molecular equivalents of the compound

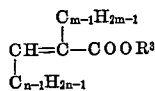

in the presence of a very strong alkaline catalyst.

2. A method for the preparation of a compound having the formula

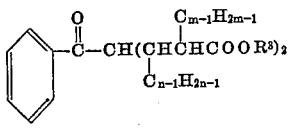

in which $n$ is an integer of one to nine, $m$ is an integer of one to three, and $R^3$ is a member from the class consisting of alkyl groups of one to eighteen carbon atoms, alkoxyalkyl groups of two to twelve carbon atoms, and aryl, alkaryl, and aralkyl groups of six to sixteen carbon atoms, which comprises bringing together at a reacting temperature in the range of about 40° to 85° C. and thereby causing to react one molecular equivalent of acetophenone and two molecular equivalents of the compound

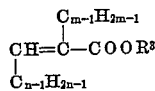

in the presence of a very strong alkaline catalyst.

3. A method for the preparation of a compound having the formula

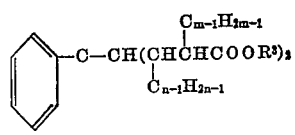

in which $n$ is an integer of one to nine, $m$ is an integer of one to three, and $R^3$ is an alkyl group of one to eighteen carbon atoms, which comprises bringing together at a reacting temperature in the range of about 40° C. to the reflux temperature of the reaction mixture and thereby causing to react one molecular equivalent of acetophenone and two molecular equivalents of the compound

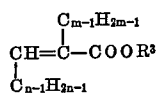

in the presence of a very strong alkaline catalyst.

4. A method for the preparation of dimethyl 2,6-dimethyl-4-benzoylpimelate which comprises bringing together at a reacting temperature in the range of about 40° C. to the reflux temperature of the reaction mixture and thereby causing to react one molecular equivalent of acetophenone and two molecular equivalents of methyl methacrylate in the presence of a very strong alkaline catalyst.

5. A method for the preparation of dimethyl 4-benzoylpimelate which comprises bringing together at a reacting temperature in the range of about 40° C. to the reflux temperature of the reaction mixture and thereby causing to react one molecular equivalent of acetophenone and two molecular equivalents of methyl acrylate in the presence of a very strong alkaline catalyst.

6. A method for the preparation of dibenzyl 2,6-dimethyl-3,5-diethyl-4-benzoylpimelate which comprises bringing together at a reacting temperature in the range of about 40° C. to the reflux temperature of the reaction mixture and thereby causing to react one molecular equivalent of acetophenone and two molecular equivalents of benzyl 2-methyl-2-pentenoate in the presence of a very strong alkaline catalyst.

7. A method for the preparation of diethoxybutyl 2,6-dimethyl-4-benzoylpimelate which comprises bringing together at a reacting temperature in the range of about 40° C. to the reflux temperature of the reaction mixture and thereby causing to react one molecular equivalent of acetophenone and two molecular equivalents of ethoxybutyl methacrylate in the presence of a very strong alkaline catalyst.

8. A method for the preparation of diethyl 2,6-diethyl-4-benzoylpimelate which comprises bringing together at a reacting temperature in the range of about 40° C. to the reflux temperature of the reaction mixture and thereby causing to react one molecular equivalent of acetophenone and two molecular equivalents of ethyl ethacrylate in the presence of a very strong alkaline catalyst.

References Cited in the file of this patent

UNITED STATES PATENTS

| 2,339,373 | Bruson | Jan. 18, 1944 |
| 2,770,640 | Journeay | Nov. 13, 1956 |

FOREIGN PATENTS

| 720,223 | Germany | Apr. 2, 1942 |
| 593,475 | Great Britain | Oct. 17, 1947 |

OTHER REFERENCES

Bruson et al.: J. Am. Chem. Soc., 64, 2853 (1942).